United States Patent [19]

Hering

[11] Patent Number: 4,608,960
[45] Date of Patent: Sep. 2, 1986

[54] PANELS OR MOULDED ELEMENTS DESIGNED AS HEAT-EXCHANGERS

[76] Inventor: Reinhard Hering, Via Matteo da Campione 5, CH-6911 Campione/Lago di Lugano, Switzerland

[21] Appl. No.: 560,191

[22] Filed: Dec. 12, 1983

[30] Foreign Application Priority Data

Dec. 16, 1982 [DE] Fed. Rep. of Germany ....... 3246541

[51] Int. Cl.$^4$ .............................................. F24J 2/02
[52] U.S. Cl. .................................... 126/431; 126/444; 126/450; 165/168; 428/163; 428/188
[58] Field of Search ............... 156/128 L, 62.2, 210, 156/212, 219, 220; 264/119; 428/165, 507, 511, 537, 163, 188, 178, 179, 182, 18 C; 165/168, 169, DIG. 8; 126/400, 431, 444, 450; 52/807

[56] References Cited

U.S. PATENT DOCUMENTS

| 1,955,984 | 4/1934 | Strobel | 428/496 |
| 2,125,847 | 8/1938 | McKenzie | 428/486 |
| 4,061,813 | 12/1977 | Geimer et al. | 264/119 |
| 4,127,636 | 11/1978 | Flanders | 264/113 |
| 4,256,087 | 3/1981 | Sowers | 126/426 |
| 4,257,481 | 3/1981 | Dobson | 165/168 |
| 4,414,960 | 11/1983 | Wasserman | 126/426 |

FOREIGN PATENT DOCUMENTS

| 1150465 | 7/1983 | Canada. |
| 0009053 | 4/1980 | European Pat. Off. . |
| 2637511 | 2/1978 | Fed. Rep. of Germany ... 165/DIG. 8 |

Primary Examiner—Michael Ball
Attorney, Agent, or Firm—Max Fogiel

[57] ABSTRACT

A method for producing weather-resistant panels of moulded elements consisting of particles, e.g. fibres or chips, mixed with bonding agents, or of raw materials prepared in some other way and pressed together under heat, a layer of vulcanizable elastomeric substances, such as natural and/or synthetic rubber or the like, being applied to the top and/or bottom of this loose or precompacted mixture prior to hot-pressing and the said mixture being vulcanized during the said hot-pressing in such a manner that the said panels or moulded elements may be produced quite simply as heating or cooling devices. This is achieved in that, for the purpose of producing integrated hollow conduits, trough-like depressions, lined with the said vulcanizable layer, are produced in the surface of the base-material before or during the hot-pressing, the said depressions being covered by an additional layer which bridges them over.

12 Claims, 9 Drawing Figures

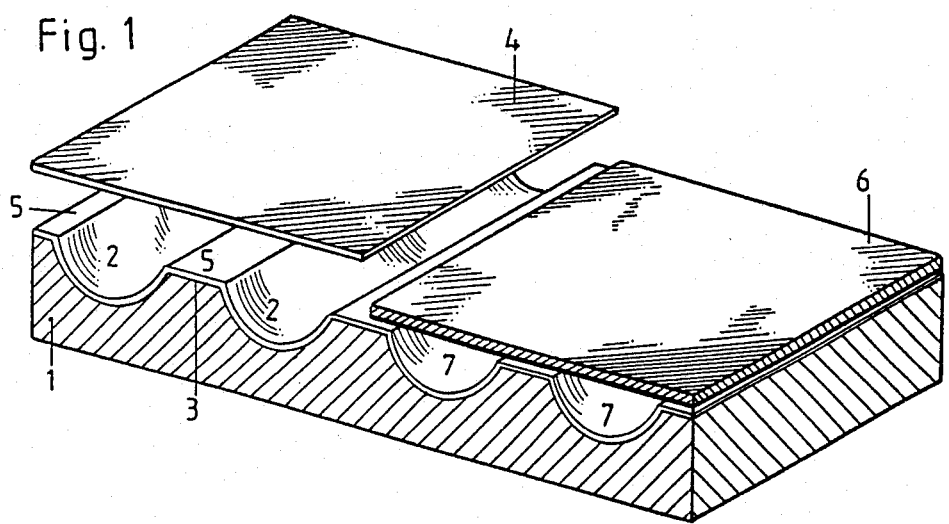
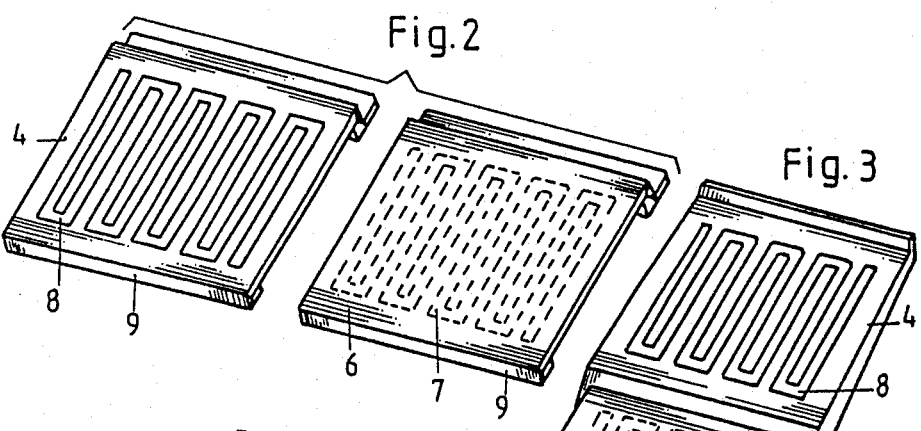
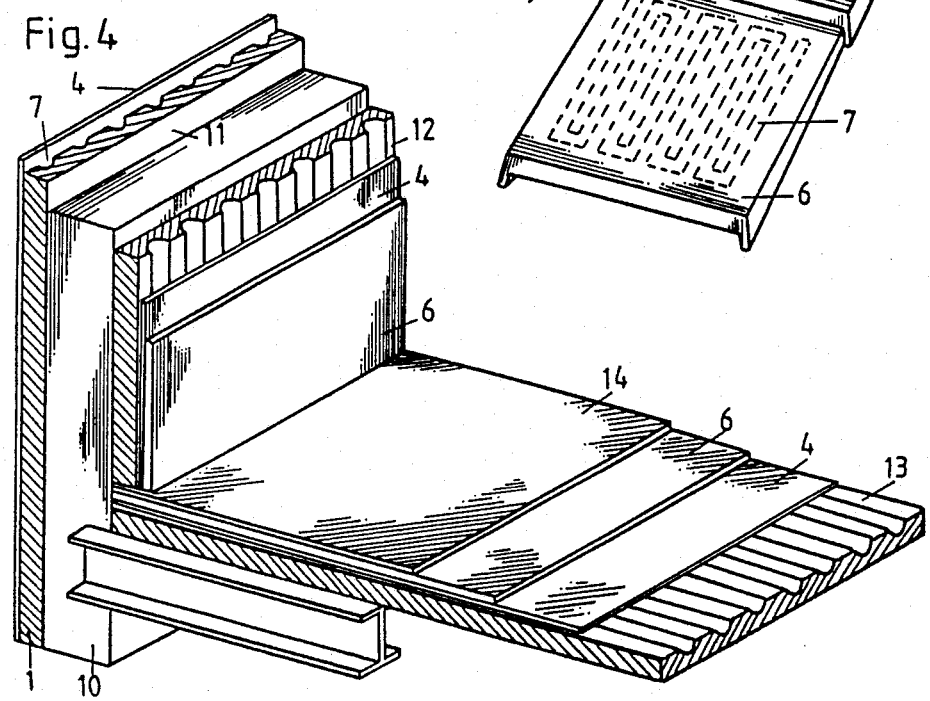

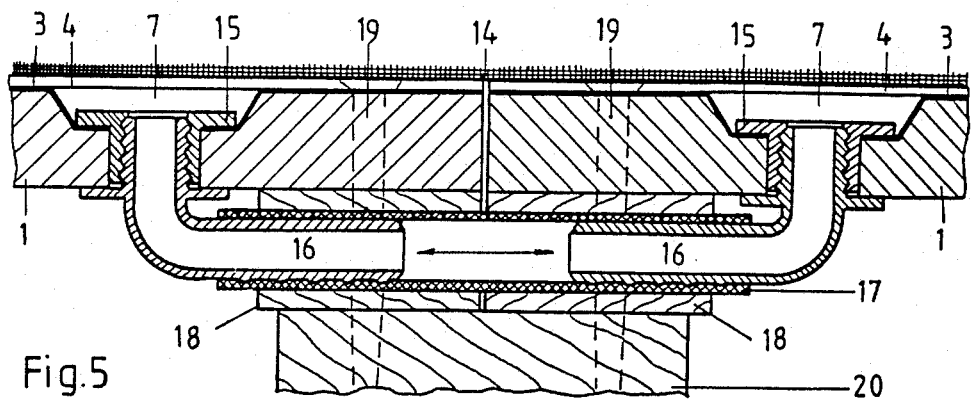
Fig.5
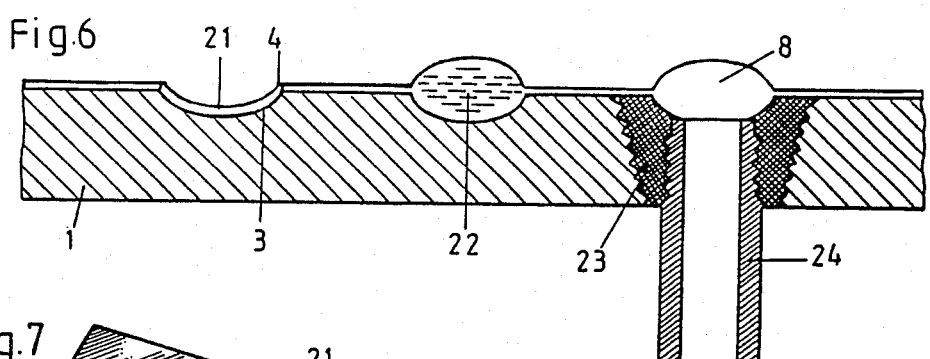
Fig.6
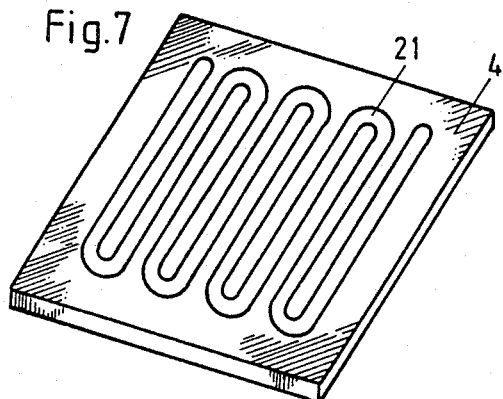
Fig.7
Fig.8
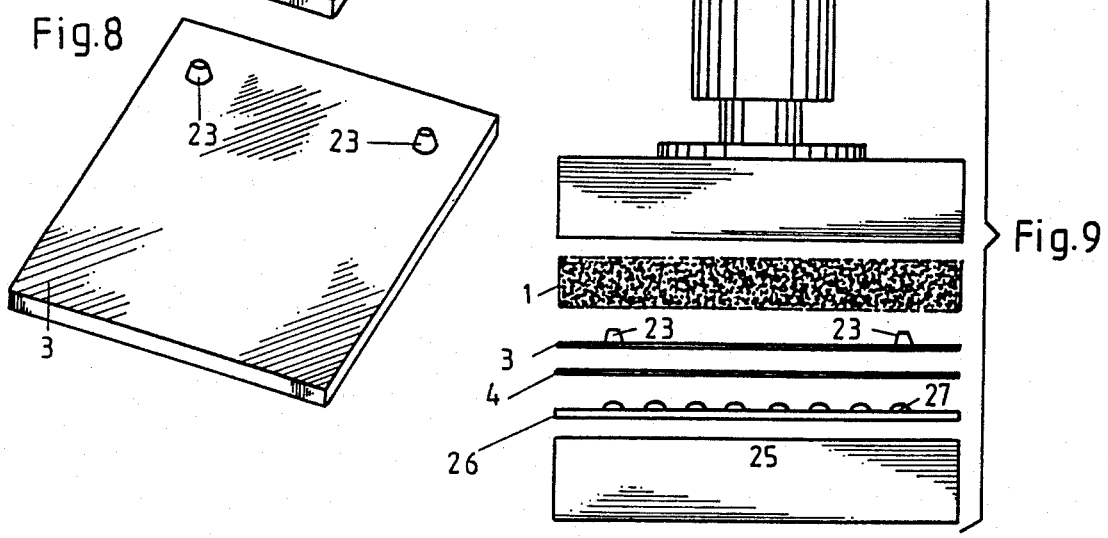
Fig.9

PANELS OR MOULDED ELEMENTS DESIGNED AS HEAT-EXCHANGERS

The invention relates to a method for producing panels or moulded elements designed as heat-exchangers which may be used, more particularly as structural elements for a very wide variety of applications; it also shows the products manufactured by the said method.

European Application No. 78 100 902.2, by the same Applicant, also discloses a method for producing such panels or moulded elements which consist of particles of wood, fibres containing lignocellulose mixed with bonding agents, or raw materials made in some other way and pressed together under heat, a covering layer of vulcanizable elastomeric substances, such as natural and/or synthetic rubber or the like, being applied to the top and/or bottom of the chip-cake prior to hot-pressing by which its is vulcanized. Austrian Pat. No. 15 53 78 also describes quite generally wood-panels for cabinet-makers and carpenters, which may be coated with rubber among other things.

In addition to this, an increasing number of devices have become known in recent years, the purpose of which is to utilize incident solar heat. For example, German OS No. 26 38 815 describes panels of foam-material with molded ducts which are sealed and coated with glued-on coverings of synthetic strip and, in addition to this, are covered with similarly glued-on heat-conductive sheets of aluminum or copper. German OS No. 25 36 687 also uses foam as the base-material, into which are subsequently inserted ducts which carry liquids, are made of deep-drawn semi-finished synthetic material, and which are closed off, over an air-space, with panels permeable to radiation. Moreover, German OS No. 28 11 829 discloses a roof-covering made up of separately produced supporting, insulating and covering layers in which are embedded metal liquid-circulating ducts. Finally, British Pat. No. 20 31 141 describes solar panels made up of sheet-aluminum, molded-in ducts, a transparent cover, and a supporting core made of a foam-material, while U.S. Pat. No. 41,64,933 relates to cement panels with cast-in meander-pattern pipelines which may be used on the outside of buildings as collectors and on the inside as heating elements.

Now it is the purpose of the present invention to design panels or. moulded elements, made in this or similar ways, in such a manner that they may be used for heating or cooling devices or the like and are particularly light and easy to manufacture.

The production of such collecting, heating or cooling elements, usually consisting of many lengths of pipe, separate sheets and the like, requires a considerable amount of material and a large number of operations. Generally speaking, therefore, they are expensive, heavy and often unsatisfactory, the final assembly thereof being labour-intensive and costly. Even if such heating and cooling devices are integrated into the structure, for example as floor- or ceiling-heaters, this does not reduce production costs.

It is therefore also the purpose of the invention to reduce the overall costs of materials and labour, during production, assembly and installation.

According to the invention, this is accomplished by means of a structural element with integrated hollow conduits for circulating liquid or gaseous heating and-/or cooling media. These elements may be used, on the one hand, in the form of roof-coverings, facade-linings, etc. as solar collectors and, on the other hand, as heating or cooling wall-, floor- or ceiling-panels. Structural elements of this kind are produced in that, for the purpose of obtaining integrated hollow conduits, trough-like depressions, lined with a vulcanizable layer, are impressed, during hot-pressing, into the surface of the base-material anad are covered by an additional covering layer which bridges over the said depressions.

During the hot-pressing of the base-material, it is desirable to impress into the coated side of the blank, a trough-like depression defining the pattern and the cross-section of the hollow conduit; in an additional pressing operation, a covering layer, bridging over the said depression, is applied and is united firmly with the existing layer in the surface-area adjacent the said depression.

Structural elements, mainly in form of panels, but also as molded tiles or coffers, and produced in this way, are explained hereinafter in conjuction with the drawings attached hereto, wherein:

FIGS. 1 to 4 are diagrammatical representations of the design and application of such structural elements;

FIG. 5 is a cross-section through two structural elements connected together by an integrated hollow conduit;

FIG. 6 is a cross-sectional representation of another example of embodiment;

FIGS. 7 to 9 are diagrams demonstrating the production process for the structural elements according to the invention.

In principle, the structural elements according to the invention are built up as follows:

the surface of the base-material, which provides dimensional stability and the best possible heat-insulation, contains the pattern of the hollow conduit in the form of a depression of semi-circular cross-section for example, and is completely coated with a layer of vulcanizable material which follows this pattern and adheres firmly to the said base-material, the said vulcanizable material being resistant, and impermeable, to the relevant heating and cooling media. Another, overlying covering layer, made of the same or another similarly resistant substance, which bridges over the depression and is firmly and sealingly united, in the adjacent flat areas, with the elastomeric layer on the base-material, constitutes the outer closure of the structural element and transforms the said depression into a complete hollow conduit. This covering layer may be either soft and resilient or may consist, possibly in conjunction therewith, of a stable material which can be walked upon and can carry loads. The said covering layer must also possess properties which encourage incoming and outgoing radiation or particularly good heat-conducting or -distributing properties, as displayed by metal-foil and sheet-metal, for example. It may contain reinforcing elements, it may be transparent with or without special filtering action and, if necessary, it may be provided, during or after production, with additional floor- or wall-covering material, synthetic-resin plaster, or some other, e.g. decorative surface.

A variant of such structural elements which is, above all, advantageous from the point of view of production but which does not produce hard outer surfaces subject to wear and is suitable for roof-coverings with integrated collectors, is built up as follows: instead of only one, two separate elastomeric layers are vulcanized to the stable, insulating base-material, the said layers following the conduit-depressions. By reason of a parting agent, following the pattern of the conduits and applied previously, the said layers unite with each other in the area between and adjacent to the conduits, and they open out into a hollow conduit as soon as they are filled with a heating or cooling medium. Thereafter the conduit-system is recognized, in its half cross-section, as a plastic elevation on the surface. Here again, under certain circumstances it is possible to use transparent material, possibly reinforced with fabric or fibres, in order to increase permeability to radiation or stability.

At the inlet- and outlet-locations, each element or conduit-section is generally provided with integrated connecting bushes, so that individual units can be connected, with the aid of pipe- or hose-connectors, for example, either into groups or to a central supply-system.

Methods for producing these structural elements, with integrated hollow conduits, are based mainly upon the use of raw materials which can be formed, consolidated and united by hot-pressing. Under these conditions, the structural element first described may be produced in two consecutive pressing processes, for example as follows: a loose mixture of particles and/or fibres and/or chips, for example wood, mineral or glass fibres, etc., mixed with bonding agents and covered with a layer of still unvulcanized rubber or some other vulcanizable elastomer, is compressed in a hot press which contains, as an internal or detachable pressure-plate, the raised negative mould comprising the pattern and cross-section of the final hollow conduit, the said compression being carried out under the action of pressure, time and temperature. In a further operation, the actual covering layer is pressed to this intermediate product, now provided on one side with a firmly adhering layer of rubber which is vulcanized-on, is fully cured, or is at least scorched, and with the recessed conduit-system, if necessary after the insertion of connecting bushes for the attachment of subsequent feed and return lines, the actual covering layer being pressed-on in still another operation. The latter may consist either merely of a possibly reinforced layer of rubber of the same or similar kind or, with or without it as a connecting intermediate layer, of sheet-metal (or a rubber-metal compound) and/or materials determined by the purpose for which it is to be used, and being connected to the first blank in the area of the parts located between and adjacent the conduits, for example by revulcanization or by welding, gluing or the like. In this way, the structural element, in the form of a panel or of a three-dimensional moulding, is ready for laying or for assembly to the structure.

If there is no requirement for the outer layer to hard, to be walked on or to carry loads, a structural element of this kind, with an integrated hollow conduit, can even be made in a single pressing operation. A layer of unvulcanized elastomeric material, preferably in the form of a foil, is first applied to the uncompacted mixture of particles, chips and bonding agents, the side of the elastomeric material facing the base-substance being already fitted with connecting elements for subsequent feed and return lines. This is followed by an additional layer, also of unvulcanized material which is coated, on the side turned towards the inside, with a parting agent, the shape and placing of which corresponds to the pattern of the hollow conduit provided. As a raised negative, this is either a part of the press-tool or of a detachable press-plate. This is now subjected to hot-pressing which compacts the base material and produces stability by curing the bonding agent. At the same time, the inner layer of rubber is connected to the whole area of the base-substance, by vulcanizing, and to the outer rubber layer only where this is not prevented by the parting agent. The surface of the finished product leaving the press now carries a firmly adhering double layer of rubber intially recessed into the conduit-pattern, which opens out and forms the hollow conduit as soon as a liquid or gaseous medium enters and moves therein. This part is therefore already finihsed and is ready for assembly and laying. At least the outer layer should and can consist of a weather-resistant rubber mixture, as far as possible possessing properties promoting inward or outward radiation of heat. The production method outlined above may, of course, be extended by further processes. In addition to this, the use of other materials, e.g. deep-drawing materials, may lead to other techniques for coating the base-substance or lining and joining the hollow conduit.

Regardless of which the methods, outlined here only in principal, is used to produce such structural elements with integral hollow conduits, the said elements have the following advantages over conventional solutions:

1. it is possible to produce elements covering very large areas;
2. the base-material may be used as the heat-insulation necessary in nearly all cases, by suitable selection of material, density and layer-thickness;
3. the use of low-cost materials, and the small number of operations required, make production very simple and extraordinarily inexpensive;
4. these elements have dual functions, since they may be used as roof-collectors and roof-coverings, wall-collectors and facade-linings, wall claddings and heating elements, load-carrying floor-panels and floor-heaters, at the same time.

If they are to utilize ambient heating or solar radiation, for example as collectors, these elements may be designed as flat roof-panels or large-format tiles. In the form of flat panels, they may be used in whole or part-areas for outer-wall cladding. In suitable configurations, they may be suspended as fascade-elements and may be connected together to form large functional units. They are also conceivable as so-called energy-fences, in which case they may be in the form of panels or of individual elements adapted to be coupled together.

In the interior of buildings they may be used mainly for heating and/or cooling the premises, either in the form of sheets or decorative elements in the form of wall-panels, ceiling-coffers, etc.. They may be laid for floor-heating, suspended for ceiling-heating. As wall-heating elements they may cover all or part of a surface and, under certain circumstances, they may even be built-in in such a manner that their function is no longer externally visible. Connections and control-elements may be accommodated out of sight, for example in skirting boards. Furthermore, connecting elements without duct-systems may be produced in the same way and in the same configurations, and may be used, for example, to extend roof-coverings, facades, internal walls or ceilings where collecting, heating or cooling units are in only partial use.

In the drawings attached hereto:

FIG. 1 illustrates the principal of a structural element with an integral hollow conduit. Base-material 1, which is dimensionally stable and is, as far as possible, also a heat-insulator, is coated on one side, over its whole area, including the depressions of the conduit-system 2, with a firmly adhering layer of material 3 which is resistant to heating and cooling media and does not permit leakage. A covering layer 4, made of the same or of some other suitable material which can be firmly and sealingly connected to layer 3 in areas 5 between and adjacent the conduit-system, closes off the said structural element, either of itself or in conjunction with an outer cover 6, in such a manner as to form hollow conduits 7 thereunder.

Shown at the left of FIG. 2 is a section of roof-panel, the upper half of hollow-conduit profile 8 appearing raised on the weather-resistant, resilient covering layer 4 thereof. Folding also makes the said covering layer effective as an edge-protection 9. A similar section of roof-panel, but with hollow conduits 7 covered by outer cover 6, is shown at the right of the figure.

FIG. 3 illustrates roof-elements in the form of tiles. In the case of the upper tile, the half cross-section of hollow conduit 8 appears as a raised profile in and on covering layer 4. In the case of the lower tile, the entire hollow conduit 7 lies under outer cover 6.

FIG. 4 shows the case of wall-collector 11, suspended in front of outer wall 10 as a facade-panel, hollow conduits 7, embedded in insulating base-panel 1, are closed off externally merely by a single covering layer 4 made of sheet-aluminum, for example.

A similar element on the inside of outer wall 10 acts as a wall-heating element 12, an additional, e.g. decorative, outer cover 6 being applied to radiating covering layer 4.

In the case of element 13, used for floor-heating, hollow conduits 7 are first covered with a resilient covering layer 4 acting as a connecting medium, then with a hard outer cover 6 which can be walked upon, and finally with a soft covering 14, for example carpeting.

FIG. 5 is an example of the assembly of conduit connections for two floor-heating panels. Before covering layer 4, which in this case is hard and can be walked upon, is fitted, connecting bushes 15 are inserted into the semi-finished floor-heating panels initially provided only with layer 3, the hollow conduits being expanded to accommodate the said bushes. Elbow connectors 16 are screwed into the said bushes from below and serve to seal off the connecting system. Connectors 16 are joined together by a length 17 of hosepipe, the said joint passing through openings in supporting element 18. Before carpeting 14 is laid, the panels are secured with screws 19 to base 20.

FIG. 6 is a cross-section through a part of a structural element, with integral hollow conduits, adapted to be produced in one operation. A layer 3 and a covering layer 4 are vulcanized and cured at the same time to base material 1 during the compression-moulding process. In the coduit-area, where the two layers cannot become united with each other because of previously applied parting means 21, they open out, after the heating or cooling medium has been intriduced, to form hollow conduit 8. Hosepipe connector 24 is screwed into connecting bush 23 which is made of hard rubber, for example and which is fitted during the pressing operation.

FIGS. 7 to 9 show: a view of covering layer 4 with parting means 21 applied in accordance with the pattern of the hollow conduits; a view from below of coating 3 with connecting bushes 23 to be pressed-in; and a view of press-platten 25 with negative mould 27 of the final hollow conduit 8. Above this is covering layer 4 (with parting means), layer 3 with connecting bushes 23, and then the particle-fibre-chip mixture, with bonding agent, still uncompacted.

I claim:

1. A heat exchanger plate comprising a fluid absorbable base plate-shaped member of fiber or chip heat insulating material mixed with binding agent and having an upper surface; said fiber insulating material forming an inflexible integrated and inseparable binding material that is rigid and stressable; two vulcanizable elastomeric fluid tight layers connected to said upper surface of said base plate-shaped member; semi trough-shaped hollow spaces extending in predetermined directions on said base member between said elastomeric layers for conducting fluids through said through-shaped hollow spaces; said trough-shaped spaces comprising depressions molded into said upper surface, one of said elastomeric layers conforming substantially to said depressions and being intimately united with the material of said base member at all contacting areas; the other one of said elastomeric layers being intimately united with said one elastomeric layer except at areas defined by said hollow spaces for conducting fluids and bulging out to form said hollow spaces; said heat exchanger plate comprising further a structural element having combined stress carrying and insulating characteristics.

2. A heat exchanger plate as defined in claim 1, wherein said elastomeric layers have embedded metal particles to increase heat conductivity.

3. A heat exchanger plate as defined in claim 1, wherein said elastomeric layers are transparent.

4. A heat exchanger plate as defined in claim 1, wherein said elastomeric layers have selective filtering properties for increasing heat transfer by radiation.

5. A heat exchanger plate as defined in claim 1 including means for combining said heat exchanger plate with a roof.

6. A heat exchanger plate as defined in claim 1, and comprising further a facade element.

7. A heat exchanger plate as defined in claim 1, and comprising further an energy collector.

8. A heat exchanger plate as defined in claim 1, and comprising further a wall element.

9. A heat exchanger plate as defined in claim 1, and comprising further a floor element.

10. A heat exchanger plate as defined in claim 1, and comprising further a ceiling element.

11. A heat exchanger plate as defined in claim 1, wherein said elastomeric layers have a decorative configuration.

12. A heat exchanger plate as defined in claim 1, including outer covering means on said other one of said elastomeric layers.

* * * * *